United States Patent [19]

Borisov et al.

[11] 4,095,156
[45] June 13, 1978

[54] DEVICE FOR AUTOMATIC DIMENSION CONTROL OF EXTRUDED BLANKS

[76] Inventors: Vladimir Alexeevich Borisov, ulitsa Andrianova, 38, kv. 35; Ravil Abdrakhmanovich Akhmedzhanov, ulitsa Tsiolkovskogo, 4a, kv. 14; Jury Vsevolodovich Chistyakov, prospekt Mira, 2b, kv. 47, all of Omsk, U.S.S.R.

[21] Appl. No.: 779,535

[22] Filed: Mar. 21, 1977

[51] Int. Cl.$^2$ ............................................. G05B 19/24
[52] U.S. Cl. ...................................... 318/571; 318/39; 425/135
[58] Field of Search ...................... 318/39, 571, 72, 55; 425/135, 140, 162

[56] References Cited

U.S. PATENT DOCUMENTS

| | | | |
|---|---|---|---|
| 3,513,501 | 5/1970 | Hearns | 425/140 |
| 3,693,064 | 9/1972 | Kiwiet | 318/571 |
| 3,887,314 | 6/1975 | Andresen et al. | 425/135 |

*Primary Examiner*—B. Dobeck
*Attorney, Agent, or Firm*—Robert E. Burns; Emmanuel J. Lobato; Bruce L. Adams

[57] ABSTRACT

A device for automatic dimension control of extruded blanks comprises a means for measuring the blank width, having its output connected to an input of a third adder whose second input is connected to a means for presetting the blank dimensions and whose output is connected to the input of an amplifier-converter, a motor for driving the screw of an extruder, with an extruder screw rpm sensor, a motor for driving a drawing-off device, with a draw-off speed sensor, a means for presetting the draw-off speed, a first adder whose inputs are connected, respectively, to a means for presetting the extruder screw rpm and to said extruder screw rpm sensor and whose output is connected, via a first amplifier, to said screw drive motor, a second adder whose first input is connected to said draw-off speed sensor and whose output is connected, via a second amplifier, to said drawing-off device drive motor, a nonlinearity unit, a compensator unit, and a fourth adder whose first input is connected to the output of the compensator unit having its input connected to the extruder screw rpm sensor, the second input of the nonlinearity unit being connected to the extruder screw rpm sensor and receiving a bias voltage, while the first input of the nonlinearity unit is connected to the output of the fourth adder, the output of the amplifier-converter is connected to the second input of the fourth adder, and the outputs of the nonlinearity unit and draw-off speed presetting means are connected to the first input of the third adder via a switch.

1 Claim, 3 Drawing Figures

DEVICE FOR AUTOMATIC DIMENSION CONTROL OF EXTRUDED BLANKS

The present invention relates to automation of processes of producing long blanks from polymer materials, and more particularly to a device for automatic dimension control of extruded blanks, specifically, for automatic control of the cross-sectional dimension of an automobile inner tube as it is being extruded.

As is well known, the requirements on the dimensions of articles from polymer materials are becoming increasingly stringent. Therefore, one of the most important trends in the development of improved polymer processing techniques is increasing the quality and dimensional stability of the finished product. The dimensional stability of automobile inner tube blanks is determined by a multitude of factors which can be divided into two major categories: process and metrological. The process factors include the properties of the raw material, stability of extrusion parameters (pressure of the rubber compound in the extruder head, cooling of the screw and barrel, etc.), operating conditions, structural features and condition of the process equipment. The metrological factors involve errors in measuring the geometrical characteristics of a blank and parameters of the production process. The parameters of extrusion vary in a random manner. The dimensional stability of extruded blanks can be enhanced by stabilizing both individual input parameters of the extrusion process (composition and physicomechanical properties of the rubber compounds, feed rates, pressure of the compound in the extruder, temperatures, etc.) and the output parameter, i.e. the extrudate dimensions, by compensating for the variations caused by the process factors. Reducing the effect of perturbing factors at the inlet improves, to some extent, the extrusion process and minimizes variations in the blank dimensions. However, the possibilities of improving the process of preparing rubber compounds, the actual conditions of processing them at all stages of the extrusion process, as well as the condition and performance characteristics of the process equipment impose certain limitations. It should also be added that stabilization of the input parameters of the extrusion process is not always economical.

Known in the art are photoelectric device for stabilizing the dimensions of extruded products, permitting the diameter of a hose made from a transparent film to be controlled by blowing air into the hose and bleeding it therefrom.

These prior art devices do not make it possible to control the dimensions of opaque sheets, films, sections and tubes fabricated from rubber compounds. prevent usable There is also known a device for controlling the dimensions of a one-piece tread band, comprising sensors for measuring the basic parameters of the extrusion process, connected to the inputs of an adder which is associated with an actuator via a control unit. In this device, such parameters determining the dimensional stability as the temperature of the rubber compound in the extruder head is the intensity of the current consumed by the screw drive are measured, the readings are processed with the aid of the coupling equation, the obtained values are compared with aforesaid preset ones, and the resulting difference is conventional as a control action for the actuator.

However, in the above device the output value, i.e. the width of the extruded band, is controlled but indirectly, by the variation in individual input parameters of the extrusion process, obeying random distribution laws. Since one cannot practically control all the random factors affecting the extrusion process and since control of these factors and their interrelations is of probabilistic nature, the blank width cannot be accurately measured. The fewer determining factors are covered by the coupling equation on which this device is based, the higher the mean square deviation of the blank width from the design value.

A method of controlling the extrusion of visco-elastic materials is known, which is carried out by a device comprising a means for sensing the cross-sectional dimensions, associated with an error amplifier whose output is coupled to a control valve varying the pressure of the gas or liquid in the pressure chamber through which the extrudate passes. The controlled gas or liquid pressure is applied into the chamber immediately after the extrudate comes out of the filtre, to change the degree of swelling, by compressing or expanding the extrudate at the moment when the highest rate of relaxation of internal stresses in the material is reached. Thus, the extrudate dimensions are stabilized.

A disadvantage inherent in this prior art device resides in that the dimensions of visco-elastic materials are controlled by applying pressure of vacuum to vary the degree of swelling of the extrudate in the area of its active forming, and this kind of control has limited application. The device cannot be used in extrusion of long hollow blanks: tubes, hoses and sleeves. This narrows the field of application of the device.

The heart of another prior device for controlling extrusion at a rubber plant is a TV camera with a computer means. In this camera use is made of an image signal shaper in the form of a line matrix of MOS-photodiodes and a special controller based on a microprocessor.

The TV camera with a computer means provides for a feedback channel. The threshold levels in the camera are set so that the image of a strip under control is black against a white background. When the strip starts "drifting", i.e. when it becomes too wide or too narrow, the microprocessor reacts to this variation and sends a feedback signal to the controller. The latter changes the speed of the roller-conveyor step motors.

The disadvantages of this device are as follows:

the use of a TV camera with a computer means as the width sensor necessitates special conditions for its operation (dustfree environment, absence of variations in the optical density of the surrounding medium, which may be due, for example, to convective flows, etc.);

this device is not accurate enough when applied to automobile inner tubes because of the different radiuses of bending of a flatly spread tube, which vary depending on the size, rubber grade, temperature, etc.;

in this device, no provision is made for invariant relations at least between the main perturbing factors, which adversely affects the control accuracy, and the fact that high accuracy is attained by increasing the gain factor substantially complicates the correction unit, the complication of the latter being due to the following: the means for controlling the width must not be a broad-band device since this may result in sharp changes in the speed of the drawing-off mechanism and disturb the extrusion process; in order to maintain constant constnat passband of the system when the gain factor is increased, the frequency band of the correction unit has to be narrowed, which is precisely what makes it more complex and expensive.

Of all the known arrangements for automatic dimension control of extruded blanks from polymer materials, the one most closely resembling the device of the present invention is an arrangement which includes an extruder and an extrudate drawing-off mechanism, both actuated by electric drives with control circuits featuring speed feedback, the extruder screw and drawing-off mechanism drive motors being kinematically associated with respective speed sensors connected, respectively, to the first inputs of a first and a second adders whose second inputs are also associated with the above sensors and whose outputs are coupled via a first and a second amplifier, respectively, to the screw and drawing-off mechanism drive motors; the above arrangement also comprises a measuring device whose output is connected to an input of a third adder having its second input connected to a means for presetting the blank dimensions and its output connected, via an amplifier-converter and a nonlinearity unit (of the "top-bottom limitation" type), to the third input of the second adder.

In this arrangement, the parameter to be controlled is the wall thickness of plastic tubes, the controlling parameter is the speed of the drawing-off mechanism, the control member is the drawing-off mechanism drive motor system, and the sensitive element is the automatic device for measuring wall thickness, producing a control signal. The means for presetting the screw and drawing-off mechanism speeds are used to provide for the required extruding and extrudate drawing off conditions. A signal representative of dimensional deviations is applied from the output of the third adder to an electronic potentiometer and converted for matching with the control device. A signal from the control device which is essentially a constant-speed servomotor kinematically associated with a reducing selsyn is applied via the second adder and an amplifier, both connected in series, to the drawing-off mechanism drive motor. The latter changes the extrudate draw-off speed, whereby the dimensions of the extrudate are altered. The circuit permitting control by dimensional deviations comprises a nonlinearity unit which limits the rotation of the servomotor by means of limit switches, thereby preventing excessive mismatch between the extrudate exit and draw-off speeds. The control circuits of the electric drives with speed feedbacks partially compensate for the instability of the rotational speed of the screw and the extrudate draw-off speed.

A disadvantage of this prior art arrangement is the lack of compensation for the perturbing factors inherent in the extrusion process. The point of thickness measurement and that of application of the control action are spaced apart along the extrudate's length, which, at the final speed of its movement, brings about a time lag between the moment the dimensional deviation is measured and the moment at which the control action to compensate for this deviation is applied. Therefore, all the destabilizing factors affecting the extrusion process, whose perior is shorter than or equal to the lag time, are not compensated for via the feedback of the control system with the result that the accuracy of maintaining the required blank dimensions is lower. In addition, the levels of limiting the nonlinear element in the control circuit effecting control by dimensional deviations are uncontrollable, and, at different extrusion speeds, it becomes necessary to provide for a broad interval between the lower and upper limiting levels. Hence, a considerable mismatch is possible between the extrudate exit and draw-off speeds, for example, when defects appear in the material of the blank being extruded, since they will give rise to high error signals in the control circuit with the result that the material in the extrusion zone is compressed or stretched and the extrusion process is disturbed; this, in turn, reduces the reliability of the device for automatic extrudate dimension control.

It is an object of the present invention to enhance the dimensional stability of extruded blanks.

Another object of the a is to increase the reliability of the automatic dimension control system. axial These objects are attained by that a device for automatic dimension control of extruded blanks, comprising a means for measuring the blank width, having its output connected to an input of a third adder whose second input is connected to a means for presetting the blank dimensions and whose output is connected to the input of an amplifier-converter, a motor for driving the extruder screw, with a sensor for measuring the extruder screw rpm, a motor for driving a drawing-off device, with a sensor for measuring the extrudate draw-off speed, a means for presetting the extrudate draw-off speed, a first adder whose inputs are connected, respectively, to a means for presetting the extruder screw rpm and to the extruder screw rpm sensor, and whose output is connected, via a first amplifier, to the screw drive motor, a second adder whose first input is connected to the draw-off speed sensor and whose output is connected, via a second amplifier, to the drawing-off device drive motor, and a nonlinearity unit, also comprises, according to the invention, a compensator unit and a fourth adder whose first input is connected to the output of the compensator unit having its input connected to the extruder screw rpm sensor, the nonlinearity unit having a second input connected to the extruder screw rpm sensor and receiving a bias voltage, the first input of the nonlinearity unit being connected to the output of the fourth adder, the output of the amplifier-converter being connected to the second input of the fourth adder, and the outputs of the nonlinearity unit and draw-off speed-presetting means being connected to the first input of the third adder via a switch.

The introduction of a compensator unit into the device makes it possible to effect control by disturbances sensed by changes in the extruder screw rpm. Automatic control by disturbances together with control by dimensional deviations ensure high dimensional stability of extruded blanks. the nonlinearity unit being provided with an additional (second) input for controlling the levels of limiting in accordance with the extruder screw rpm ensures high reliability of the proposed device for automatic dimension control of extruded blanks.

The invention will now be described in greater detail with reference to a specific embodiment unconventional taken in conjunction with the accompanying drawings, wherein.

Figure 1:
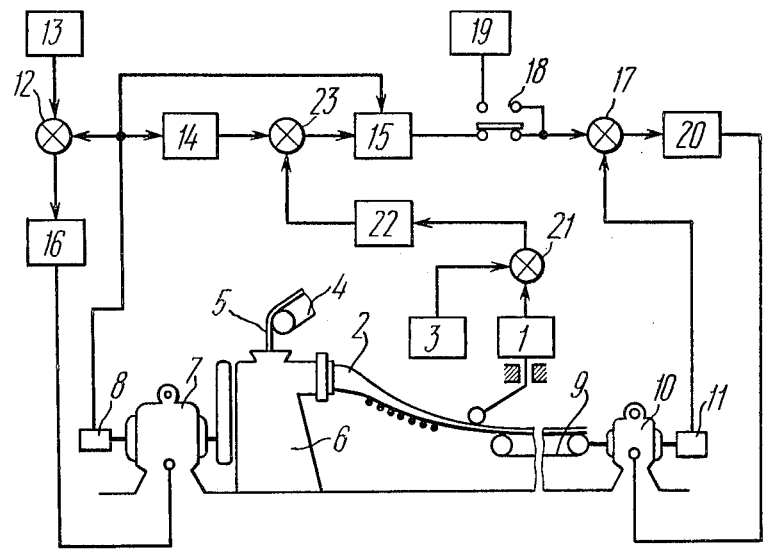
FIG. 1 is a schematic of a device for automatic dimension control of extrudates, namely, the width of an automobile inner tube blank, according to the invention; threaded

Referring now to the drawings, the proposed device comprises a means 1 (FIG. 1) for measuring the width of an automobile inner tube blank 2 with a means 3 for presetting the dimensions of the blank 2; a conveyor 3 continuously feeding a rubber band 5 into the bin of an extruder 6; a motor 7 for driving the screw (not shown) of the extruder 6, kinematically associated with a sensor 8 for measuring the extruder screw rpm; a device 9 receiving and drawing off the automobile inner tube blank 2 towards a subsequent work station; a motor 10 for driving the drawing-off device, kinematically associated with a sensor 11 for measuring the extrudate draw-off speed; a first adder 12 whose inputs are connected to a means 13 for presetting the extruder screw rpm, to the extruder screw rpm sensor 8, to a compensator unit 14 and to a nonlinearity unit 15 which limits the inputs signals from top and bottom and has a controlled characteristic, while the output of the first adder 12 is coupled via a first amplifier 16 to the extruder screw drive motor 7; a second adder 17 whose inputs are connected, respectively, to the draw-off sped sensor 11 and, via a switch 18, to a means 19 for presetting the draw-off speed or to the nonlinearity unit 15, while the output of the second adder 17 is connected, via a second amplifier 20, to the drawing-off device drive motor 10; and a third adder 21 whose inputs are connected to the blank dimension presetting means 3 and the means 1 for measuring the width of the automobile inner tube blank 2, while the output of the third adder 21 is connected, via an amplifier-converter 22, to a fourth 102 23.

The proposed device for automatic dimension control operates as follows.

The operating conditions of the extruder are preset by the extruder screw rpm presetting means 13, with the aid of a signal from the first amplifier 16, actuating the extruder screw drive motor 7. The extruder 6 receives the rubber band 5 continuously fed by the conveyor 4. Once the rotational speed of the screw of the extruder 6 has been set, automatic setting of a respective linear speed of the drawing-off device 9 takes place with the lower contacts of the switch 18 being closed.

Constant and random changes in the extrusion process parameters, namely, geometrical characteristics of the fed band, viscosity, temperature and composition of the rubber compound, supply voltage, screw and barrel cooling conditions, etc., cause pressure variations in the extruder head, which, in turn, causes changes in the extrudate exit speed, hence, dimensions of the inner tube blank 2. The pressure variations edge the head of the extruder 6 are due to the changes in the extruder screw rpm, caused by variations in the load moment. alloy, electrical The screw rpm instability is partially compensated for by the closed speed control circuit including the screw rpm sensor 8, screw rpm presetting means 13, amplifier 16 and screw drive motor 7.

The compensator unit 14 provides for a screw-rotation invariance, whereby the screw rpm and the speed of the drawing-off device 9 are matched, and signals are produced eliminating the effect of the screw rpm variations on the dimensions of the blank 2. The compensating action is provided by the following circuit: screw rpm sensor 8, compensator unit 14, fourth adder 23, nonlinearity unit 15, switch 18, second adder 17, second amplifier 20, and drive motor 10 of the drawing-off device 9, as a result of which the linear speed of the drawing-off device changes in accordance with the extrudate exit speed. Thus, the extrudate draw-off speed is maintained close to the speed of strip exit from the extruder head, which ensures a higher degree of stability of the blank dimensions. 133

However, since the relationship between the extrudate dimensions and extruder screw rpm is not functional but is of random nature, the accuracy of maintaining the desired dimensions of the blank is limited. A higher accuracy can be attained when control is effected with respect to both disturbances and dimensional deviations, i.e. deviations of the blank's width. The circuit of strip by deviation includes the measuring means 1 with the means 3 for presetting the dimensions of the blank 2, the third adder 21, the amplifier-converter 22, the fourth adder 23, the nonlinearity unit 15, the switch 18, the second adder 17, the second amplifier 20, and the drive motor 10 of the drawing-off device 9. When the width of the blank 2 deviates from the nominal width preset by the means 3, an error signal is applied from the output of the third adder 21 to the motor 10 via the amplifier-converter 22, the fourth adder 23, the nonlinearity unit 15, the switch 18, the second adder 17, and the second amplifier 20, all these elements being connected in series, causing a change in the linear speed of the drawing-off device 9, hence, a change in the width of the inner tube blank 2, as a result of which the signal from the output of the measuring means 1 changes, hence, the error signal from the output of the third adder 21 diminishes.

The instability FIGS. the linear speed of the drawing-off device 9, due to the effect of a multitude of random factors, 144 partially compensated for by a closed control circuit including the draw-off adapter sensor 11, the second adder 17, the second amplifier 20, and socket. drive motor 10 of the drawing-off device 9.

Figure 2:
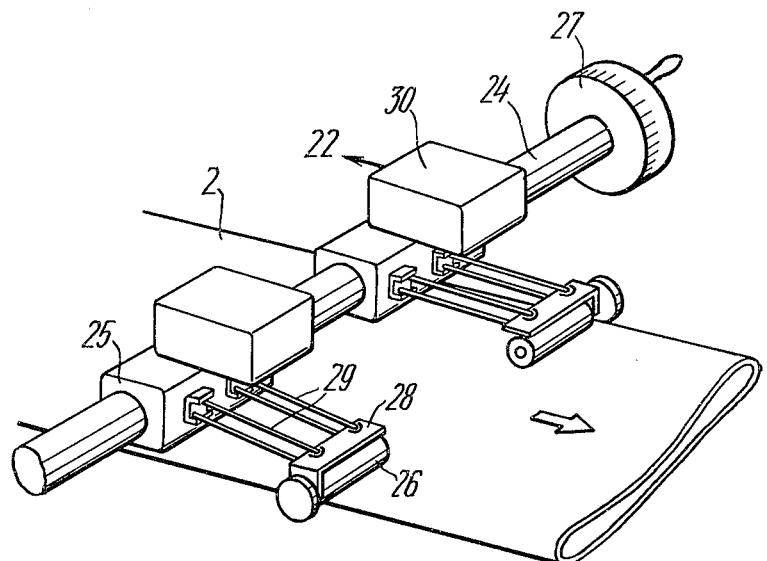
FIG. 2 is a general view of the means for measuring the width of an automobile inner tube blank, according to the invention.

The structural arrangement of the means for measuring the blank width is illustrated in FIG. 2. It comprises a shaft 24 carrying slide blocks 25 with longitudinal roller sensors 26. The distance between the slide blocks 25 is set by means of the dial on a registering drum 27 in accordance with the nominal width of the blank 2. Deviations from the nominal width are sensed by the roller sensors 26 which, by their own weight and by the weight of brackets 28, squeeze the blank 2, and the rollers of the sensors 26 being set at strictly predetermined angles to the horizontal plane ensure automatic tracking of the edge of the blank 2. Deflections of the roller sensors 26 are transmitted, via the pins of an articulated four-link mechanism 29, to rotation angle sensors 30. As a result of transverse displacement of the blank 2 without any changes in its width, the pins of the frames of both sensors 30 rotate in synchronism. The outputs of the sensors 30 being connected in series opposition and energized from the same field windings (not shown), the simultaneous rotation of the pins of both sensors 30 does cause any change in the output voltage. A positive or negative difference in the angles of rotation of the pins of the sensors 30 brings about higher or lower voltage across the outputs of the sensors 30. An output ac signal is applied from the frames of the rotation angle sensors 30 to the input of the amplifier-converter 22.

Figure 3:
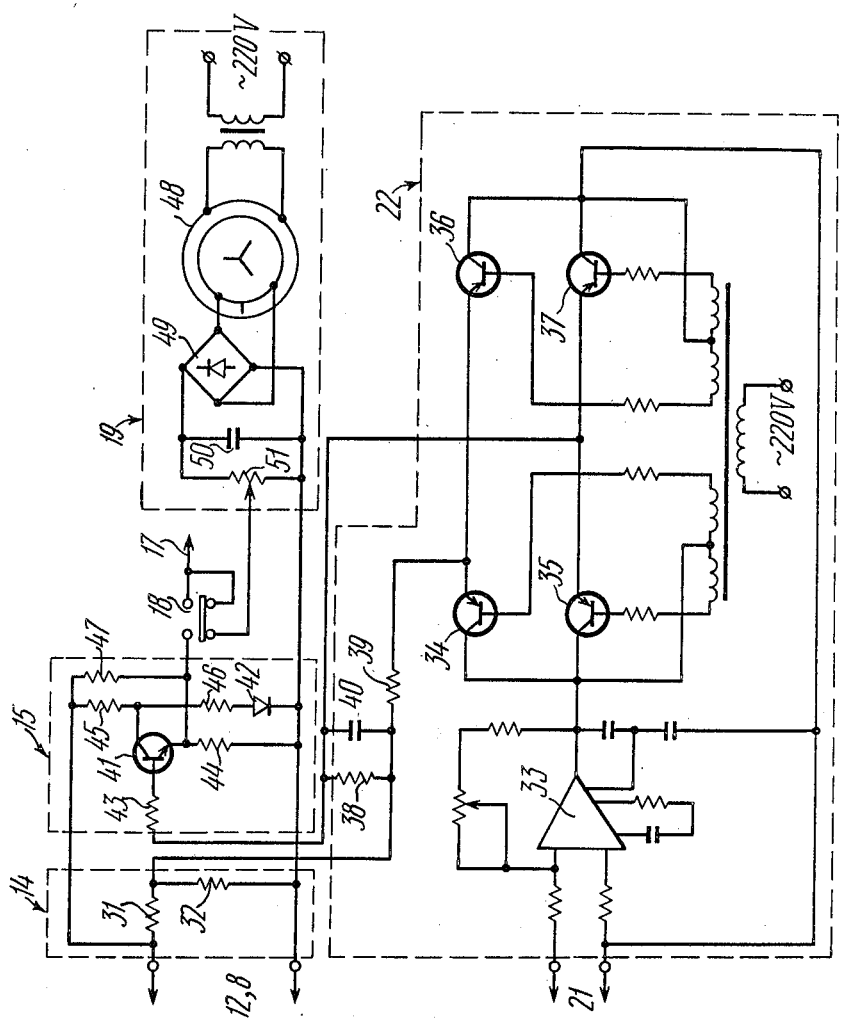
FIG. 3 is an electric circuit diagram of the compensator unit, the nonlinearity unit, the means for presetting the draw-off speed and the amplifier-converter, according to the invention.

To eliminate the time lag, the means for measuring the width of the automobile inner tube blank is located in the area where the control action is applied, i.e. in the interval between the extruder head and the receiving drum of the drawing-off device 9, as is shown in FIG. 1. edge FIG. 3 is an electric circuit diagram of the control circuit of the proposed device, including the compensator unit 14, the nonlinearity unit 15, the draw-off speed presetting means 19, and the amplifier-converter 22.

The compensator unit 14 is arranged as an attenuator with resistors 31 and 32.

The amplifier-converter 22 comprises a scale amplifier built around an operational amplifier 33, a phase-sensitive rectifier built around transistors 34 through 37, and a lowpass filter built around resistors 38, 39 and a capacitor 40.

A considerable mismatch between the extrudate exit and draw-off speeds disturbs the extrusion process, leading to accumulation of the material, as well as kinking, overstretching and even breakage of the automobile inner tube blank. Therefore, a limitation with respect to the amount of mismatch between the screw rpm and linear speed of the drawing-off device should be introduced. This function is performed by the nonlinearity unit 15 whose level of limiting is set in accordance with the magnitude of the signal from the extruder screw rpm sensor 8 (FIG. 1). Automatic shift of the characteristic of the nonlinearity unit 15 without changes in its linear portion permits a minimum possible mismatch between the extrudate exit and draw-off speeds to be provided within a broad range of extrusion speeds in the case where appreciable destabilizing factors occur in the stabilizing system.

The nonlinearity unit 15 (FIG. 3) is simple in structure. It is built around a transistor 41, a Zener diode 42 and resistors 43 through 47. The Zener diode 42 ensures a constant difference between the maximum and minimum possible speeds of the drawing-off device within the entire range of extruder screw rpm variations. The minimum draw-off speed is ensured by a voltage divider using the resistors 47 and 44, while the maximum speed is ensured by a divider using the resistors 45 and 44.

The draw-off speed sensor 19 is built around a selsyn 48 and a rectifier 49 using diodes, a capacitor 50 and a resistor 51. The sensor 19 being built around the non-contact selsyn 48 substantially increases its reliability, particularly under the harsh conditions of tyre production.

Since presetting of the extrusion process parameters requires manual control, provision is made in the device for the switch 18, the upper position whereof corresponds to manual control of the speed of the drawing-off device 9 (FIG. 1), and the lower position corresponds to automatic control.

Thus, the introduction of the compensator unit 14 into the device permits control by disturbances sensed by the extruder screw rpm variations. The automatic control by disturbances in combination with control by dimensional deviations ensures high dimensional accuracy of the extruded blanks.

The nonlinearity unit 15 being provided with an additional (second) input for controlling the levels of limiting in accordance with the extruder screw rpm ensures higher reliability of operation of the device for automatic dimension control of extruded blanks.

The use of the proposed device on an industrial scale will permit:

improving the quality of extruded blanks by automatically maintaining the required dimensional accuracy thereof;

increasing the throughput capacity of inner tube production lines and minimizing power consumption by the process equipment due to fewer blanks being returned for recycling;

improving the working conditions for the operators;

modernizing the process of production of automobile inner tubes.

What is claimed is:

1. A device for automatic dimension control of extruded blanks, comprising:

a means for measuring the blank width;

a means for presetting the blank dimensions;

a first, a second and a third adders;

said means for measuring the blank width having an output connected to an input of said third adder;

said third adder having a second input connected to said means for presetting the blank dimensions; an amplifier-converter having an input connected to the output of said third adder;

an extruder screw drive motor; socket when seperated a sensor for measuring the extruder screw rpm, kinematically associated with said extruder screw drive motor; a motor for driving an extrudate drawing-off device; means.

a sensor for measuring the extrudate draw-off speed, kinematically associated with said drawing-off device drive motor;

a means for presetting the extrudate draw-off speed; axis inputs of said first adder, connected, respectively, to said extruder screw rpm presettting means and to said extruder screw rpm sensor;

a first and a second amplifiers;

sad first adder having an output connected, via said first amplifier, to said extruder screw drive motor;

said second adder having a first input connected to said draw-off speed sensor;

said second adder having an output connected, via said second amplifier, to said drawing-off device drive motor;

a compensator unit;

a fourth adder having a first input connected to the output of said compensator unit;

said compensator unit having an input connected to said extruder screw rpm sensor;

a nonlinearity unit having a first input connected to the output of said fourth adder and a second input connected to said extruder screw rpm sensor and receiving a bias voltage;

said amplifier-converter having an output connected to a second input of said fourth adder;

a switch;

said nonlinearity unit and draw-off speed sensor having outputs connected to a first input of said third adder via said switch.

* * * * *